United States Patent
Knudtson et al.

(10) Patent No.: US 10,534,587 B1
(45) Date of Patent: Jan. 14, 2020

(54) CROSS-PLATFORM, CROSS-APPLICATION STYLING AND THEMING INFRASTRUCTURE

(71) Applicant: INTUIT INC., Mountain View, CA (US)

(72) Inventors: Eric Knudtson, Mountain View, CA (US); Richard Lee Romero, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/849,844

(22) Filed: Dec. 21, 2017

(51) Int. Cl.
  *G06F 8/38* (2018.01)
  *G06F 8/35* (2018.01)
  *G06F 8/20* (2018.01)

(52) U.S. Cl.
  CPC .......... *G06F 8/38* (2013.01); *G06F 8/20* (2013.01); *G06F 8/35* (2013.01)

(58) Field of Classification Search
  CPC .......... G06F 8/38; G06F 8/20; G06F 8/35
  USPC ........................................... 717/105
  See application file for complete search history.

(56) References Cited

U.S. PATENT DOCUMENTS

| | | | |
|---|---|---|---|
| 6,640,249 B1 * | 10/2003 | Bowman-Amuah | G06F 8/36 709/228 |
| 6,721,713 B1 * | 4/2004 | Guheen | G06Q 50/01 705/1.1 |
| 7,346,920 B2 * | 3/2008 | Lamkin | G11B 27/034 725/112 |
| 7,418,435 B1 | 8/2008 | Sedlar | |
| 7,526,719 B1 * | 4/2009 | Gopalakrishnan | G06F 16/26 715/227 |
| 7,707,507 B1 | 4/2010 | Rowe et al. | |
| 7,996,780 B1 * | 8/2011 | Mitnick | G06F 8/38 715/760 |
| 8,244,277 B1 | 8/2012 | Cha et al. | |
| 8,429,103 B1 | 4/2013 | Aradhye et al. | |
| 8,856,670 B1 | 10/2014 | Thakur et al. | |
| 9,405,427 B2 | 8/2016 | Curtis et al. | |
| 9,846,682 B1 | 12/2017 | Righetto et al. | |

(Continued)

FOREIGN PATENT DOCUMENTS

WO    2015122691 A1    8/2015

OTHER PUBLICATIONS

Title: A comparative analysis of cross-platform development approaches for mobile applications, author: Xanthopoulos et al, published on 2013.*

(Continued)

*Primary Examiner* — Chameli Das
(74) *Attorney, Agent, or Firm* — Patterson + Sheridan, LLP

(57) ABSTRACT

This disclosure relates to deploying centralized design data in a development system. An exemplary system generally includes a server configured to perform the following steps. The server receives a style element and a reference name paired with the style element. The server then generates a visual definition comprising design data associated with the style element and paired with the reference name. The server then identifies a development environment for use with the visual definition and formats the visual definition into a local definition compatible with the development environment. Finally, the server transmits the local definition to a developer device associated with the development environment.

17 Claims, 6 Drawing Sheets

(56) References Cited

U.S. PATENT DOCUMENTS

| | | | |
|---|---|---|---|
| 10,096,022 B2 | 10/2018 | Gupta | |
| 10,162,624 B1 | 12/2018 | Moturu et al. | |
| 2002/0010716 A1 | 1/2002 | McCartney et al. | |
| 2002/0059278 A1 | 5/2002 | Bailey et al. | |
| 2003/0058277 A1* | 3/2003 | Bowman-Amuah | G06F 16/289 715/765 |
| 2003/0126311 A1 | 7/2003 | Kushnirskiy et al. | |
| 2003/0145338 A1* | 7/2003 | Harrington | H04N 7/088 725/136 |
| 2004/0216058 A1 | 10/2004 | Chavers et al. | |
| 2004/0218224 A1* | 11/2004 | Cariffe | H04N 1/33323 358/400 |
| 2005/0187945 A1 | 8/2005 | Ehrich et al. | |
| 2006/0074735 A1* | 4/2006 | Shukla | G06F 8/34 705/80 |
| 2006/0206890 A1* | 9/2006 | Shenfield | G06F 8/20 717/174 |
| 2006/0236254 A1* | 10/2006 | Mateescu | G06F 8/75 715/762 |
| 2007/0204125 A1 | 8/2007 | Hardy | |
| 2008/0127091 A1* | 5/2008 | Ericsson | G06F 9/454 717/123 |
| 2009/0063988 A1 | 3/2009 | Graeff et al. | |
| 2009/0070162 A1 | 3/2009 | Leonelli et al. | |
| 2009/0235149 A1 | 9/2009 | Frohwein | |
| 2009/0249282 A1 | 10/2009 | Meijer et al. | |
| 2009/0249359 A1 | 10/2009 | Caunter et al. | |
| 2010/0228963 A1 | 9/2010 | Kassab et al. | |
| 2010/0262953 A1 | 10/2010 | Barboni et al. | |
| 2010/0274869 A1* | 10/2010 | Warila | G06F 8/24 709/217 |
| 2011/0106876 A1 | 5/2011 | Delaney et al. | |
| 2011/0191751 A1* | 8/2011 | Munday | G06F 9/44 717/108 |
| 2011/0312387 A1 | 12/2011 | Heo et al. | |
| 2012/0198457 A1 | 8/2012 | Leonelli et al. | |
| 2013/0054812 A1 | 2/2013 | DeCoteau | |
| 2013/0111373 A1* | 5/2013 | Kawanishi | G06T 11/60 715/762 |
| 2013/0151417 A1 | 6/2013 | Gupta | |
| 2013/0305218 A1* | 11/2013 | Hirsch | G06F 8/30 717/106 |
| 2014/0089824 A1 | 3/2014 | George et al. | |
| 2014/0208309 A1 | 7/2014 | Wu et al. | |
| 2014/0280214 A1 | 9/2014 | Han et al. | |
| 2014/0282014 A1 | 9/2014 | Lee et al. | |
| 2015/0089349 A1 | 3/2015 | Duplessis et al. | |
| 2015/0095882 A1* | 4/2015 | Jaeger | G06F 8/34 717/109 |
| 2016/0004565 A1 | 1/2016 | Harper et al. | |
| 2016/0269509 A1 | 9/2016 | Dooley | |
| 2017/0255455 A1 | 9/2017 | Collier et al. | |
| 2017/0344921 A1 | 11/2017 | Leonelli et al. | |
| 2018/0032318 A1 | 2/2018 | Satagopan et al. | |
| 2018/0075115 A1 | 3/2018 | Murray et al. | |
| 2018/0322136 A1 | 11/2018 | Carpentier et al. | |
| 2018/0364879 A1 | 12/2018 | Adam et al. | |

OTHER PUBLICATIONS

Title: WEBDIFF: Automated identification of cross-browser issues in web applications, author: SR Choudhary et al, source: IEEE, published on 2010.*

Title: Cross-platform development tools for smartphone applications, author: J Ohrt et al, published on 2012.*

* cited by examiner

CROSS-PLATFORM, CROSS-APPLICATION STYLING AND THEMING INFRASTRUCTURE

BACKGROUND

Field

Aspects of the present disclosure generally relate to techniques for maintaining stylistic elements of user interfaces, and more specifically to maintaining consistent stylistic elements of user interfaces of applications implemented across different platforms.

Description of the Related Art

Software applications can be run on a variety of devices, including desktop computers, laptops, tablets, smartphones, and the like. These applications may be native applications (e.g., applications for which an executable file is built specifically for that platform), web components hosted in a native application, or web applications in which data provided by a user is processed remotely. Providers of these software applications will often want to provide a consistent experience across all types of devices, including visual and stylistic elements of user interfaces. In many cases, developers of such applications will have to cross-reference an approved style guide to implement the correct style or theme for every application across every device type.

As the number of applications targeting different platforms increases, the difficulty in providing a consistent visual appearance of the same application for each device increases. For example, a set of tax preparation applications perform the same general task of preparing a user's taxes, but are each individually implemented on separate platforms. While these applications may share a significant amount of code, each application may also implement custom code in order to execute properly. Further, versions of the same application that are intended for different platforms may use different sets of graphical user interface (GUI) components or different GUI toolkits to present a user interface that allows users to interact with the application. Because different versions of the same application may implement their respective user interfaces using different GUI elements or designs, many stylistic elements of the user interface are implemented repeatedly for a given task or step in a workflow.

Because these applications are implemented separately, maintaining or updating visual elements that are desired to be consistent across all platforms requires large amounts of developer time. For example, if a software provider changes a shade of color associated with the provider, or associated with an application, development teams may need to manually update each version of the application across all devices or platforms. This updating generally entails changing multiple instances of the same color within a single application. As new platforms or devices are supported in the future, the time and energy expended on such routine updating only increases.

Therefore, there is a need for systems that provide for stylistic consistency in applications deployed across different computing platforms.

SUMMARY

One embodiment of the present disclosure includes a system for deploying centralized design data in a development system. An exemplary system includes a server configured to perform the following steps. The server receives a style element and a reference name paired with the style element. The server then generates a visual definition comprising design data associated with the style element and paired with the reference name. The server then identifies a development environment for use with the visual definition and formats the visual definition into a local definition compatible with the development environment. Finally, the server transmits the local definition to a developer device associated with the development environment.

Another embodiment of the present disclosure includes a method for deploying centralized design data in a development system. The method generally includes receiving a style element and a reference name paired with the style element. The method also includes generating a visual definition comprising design data associated with the style element and paired with the reference name. The method also includes identifying a development environment for use with the visual definition and formatting the visual definition into a local definition compatible with the development environment. Finally, the method includes transmitting the local definition to a developer device associated with the development environment.

Still another embodiment of the present disclosure includes a non-transitory computer-readable storage medium comprising instructions to be executed in a computer system, wherein the instructions when executed in the computer system perform a method for deploying centralized design data in a development system. The method generally includes receiving a style element and a reference name paired with the style element. The method also includes generating a visual definition comprising design data associated with the style element and paired with the reference name. The method also includes identifying a development environment for use with the visual definition and formatting the visual definition into a local definition compatible with the development environment. Finally, the method includes transmitting the local definition to a developer device associated with the development environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope.

DETAILED DESCRIPTION

Figure 1:
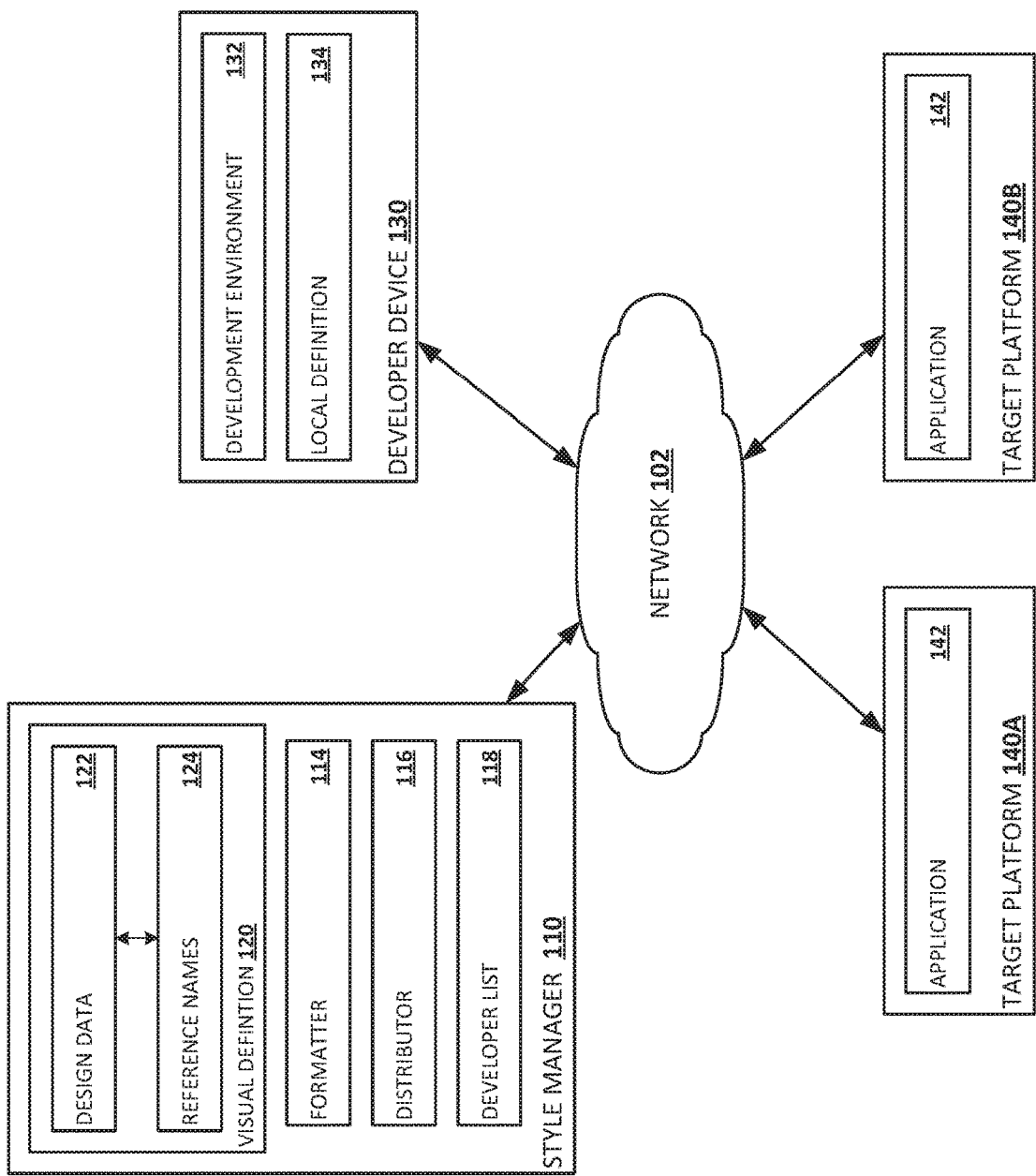
FIG. 1 illustrates an exemplary computing system in which stylistic development data for application developers is stored, formatted and distributed to those developers, according to one embodiment.

Embodiments presented herein provide techniques for maintaining design data used in the creation of cross-platform applications. Generally, the maintenance of design data entails storing, formatting and distributing centralized design data across multiple versions of the same application. By distributing consistent design data across multiple versions of the same application, applications can maintain a consistent visual appearance regardless of the platform targeted by a particular version of the application.

A cross-platform application is an application designed to execute on a plurality of platforms. A platform may refer to a device type, such as a mobile device, or a device model, such as a particular smartphone model, or an operating system running on a variety of device models, such as iOS, or an attribute of a device, such as a wide format touchscreen device, and the like. In some cases, target platforms for a software application are based on multiple attributes, such as a particular device model running a particular operating system, or having a particular set of features (e.g., a particular user interface technology). While a cross-platform application may have a plurality of different versions for different platforms, each version may provide essentially the same functionality and experience.

Software providers desire to provide an enjoyable visual experience in their products. Further, those visual experiences may be important to building a reputation for quality among users, as users may believe that a software provider that has a commitment to visual quality likely has a commitment to quality in general. Consistency in the look and feel of applications may demonstrate that a product is provided by a particular software provider and may indicate a connection between different products offered by a software provider.

However, maintaining a consistent, high-quality appearance of software products can be difficult, especially when a software provider has dozens of products. Developer time, which may already be at a premium, may be devoted to small details of visual management when creating an application. Moreover, if a software provider decides to change a style element, whether major or minor, changing all products in all necessary ways could become a behemoth task—one that may require days or weeks of developer time to simply change the style elements (e.g., shades of colors, graphics, layout, formatting, etc.). This is because if a style element was manually defined in the application, it will need to be manually re-defined to update the application (and likewise with similar applications designed for other device types). The process may proceed very slowly, despite the size of the job, in order to avoid errors in re-definition. Further, even with the utmost care, errors in the final product may result, causing even more developer time to be devoted to correcting those errors. These problems multiply with the number of style elements within an application, with the number of applications created, or with the number of platforms that an application is implemented on—all three of which will likely increase over time.

Aspects of the present disclosure generally provide systems and methods to simplify and increase the efficiency of maintaining style elements across a range of software products, for example, by centralizing essential design data relating to style elements. Style elements refer to visual or formatting aspects of the user interface of an application. For example, a certain color may be a style element, while a font may also be a style element. Design data refers to a representation of a style element that can be parsed by a computer, whether in source code or compiled machine code. Design data may be centralized and paired with a reference name for each element of design data to create a visual definition. A visual definition represents all style elements in use in the system, represented as design data and paired with reference names.

Centralizing the design data allows developers of different versions of an application to use a consistent visual definition, which may minimize visual differences in different implementations of a single application. Such differences in visual appearance could otherwise occur erroneously or by lack of strict management. Centralizing design data also allows style elements to be updated or changed much more easily, and with much less risk of error. Because all developers may work off of a common visual definition, an update to that visual definition will affect all developers in the system, meaning the different applications or parts thereof worked on by different developers will be updated consistently. In this way, software appearance remains consistent across all developers or development teams. Further, centralizing design data may even mean that developers will have to devote no time to updating style elements. As a result, managing style elements of applications will take less time and be more efficient.

FIG. 1 illustrates an exemplary computing system, according to one embodiment. As illustrated, computing system 100 includes a style manager 110, a developer device 130, a target platform 140A and a target platform 140B, connected via network 102.

As illustrated, style manager 110 includes visual definition 120, formatter 114, distributor 116, and developer list 118. Style manager 110 generally manages style elements and distributes visual definition 120 for use throughout the system. Although style manager 110 is shown as a single unit, the functions performed by style manager 110 may be distributed across multiple computing devices.

Visual definition 120 includes a listing of style elements which may be approved for use by a user, (e.g. a system administrator), stored as design data 122. Design data 122 generally includes a listing of computer-readable values representing style elements. For example, colors, which are possible style elements, are commonly encoded in a six-digit hexadecimal form to be read by computing devices. These "hex" codes are often written in the form #XXXXXX, where X is a hexadecimal digit from 0 to F. Design data 122 may include a hex code as a value for a color. Visual definition 120 contains associations between design data 122, which are values representing style elements and human-readable reference names 124 for those values. If listing an approved color, for instance, a shade of red may be represented in design data 122 as a computer-readable value, which could be hex code #FF0000, and may be associated with a reference name, like "company primary color." Design data 122 may represent many kinds of style elements, including colors, fonts, themes or any other element that affects the visual appearance of an application. Entries in design data 122 may be approved by an owner or an administrator of the computing system. Design data 122 may be the authoritative listing of which style elements are approved for use throughout the system.

Formatter 114 generally formats visual definition 120 into a form usable directly by different devices, such as local definition 134 on developer device 130. Local definition 134 may be compatible with a development environment 132. No single data format may be compatible with all developer devices 130 of the system. Thus, different developers in the system may need access to essentially the same design data, but may need that data to be formatted differently in order to be used with different devices. Formatter 114 may build visual definition 120 into different formats depending on the needs of the system. The system may support development for many platforms. For example, the system may support development for both web-based applications and for native applications. A web application developer may need a certain web application data file to develop web applications, while a native application developer may need a device-specific application data file (e.g., related to a certain model of smartphone) to develop the native applications. Both data files may contain similar information in regard to style elements. Formatter 114 can generate a version of visual definition 120 as many different formats, including those needed for a number of application platforms, (e.g., web, native mobile, desktop/laptop, native tablet, and the like). Formatter 114 may create as many different formats of visual definition 120 as are needed to support creation of all applications for all supported platforms. The formatted versions of visual definition 120 themselves contain only the approved style elements, as included in visual definition 120.

Formatter 114 may also format visual definition 120 into a definition that may not be compatible with any development environments. Instead, the local definition 134 may be compatible with an image creation program or an image manipulation program. This may allow graphic designers, using an image creation device, to make use of the same design information used by application developers. For example, a local definition 134 that is compatible with a particular image manipulation program may be used to create digital artwork, which may use colors included on the list of approved style elements. As a result, produced artwork may use a set of colors that is the same as a set of colors used in a released application. This may allow an owner and/or operator of an application development system to maintain a visual consistency between produced applications and related images.

Style manager 110 also distributes the formatted versions of visual definition 120 as needed throughout the system via distributor 116. Distributor 116 accesses developer list 118 to identify which data format is used by which developers. Developer list 118 is a pairing of developer devices 130 in use in the system and development environments 132 that are used by those devices. Developer list 118 may be generated by style manager 110 based on developer devices 130 known to be in the system. If a new developer device 130 is added to the system, style manager 110 may add a new pairing to developer list 118. A particular developer device 130 may be listed in developer list 118 more than once if, for example, the particular developer device 130 hosts more than one development environment 132. Distributor 116 uses developer list 118 to find the correct pairings, that is, which developer devices 130 should receive which local definitions 134, and then transmits, via network 102, the formatted versions of visual definition 120 to developer devices 130. In some embodiments, style manager 110 may distribute an unformatted version of visual definition 120 to certain developer devices 130. For example, some development environments 132 may be able to use visual definition 120 before formatting.

In some embodiments, style manger 110 may generate a printable document containing the information of visual definition 120. That is, style manager 110 may produce a document suitable for printing, that, when printed, may comprise a physical style guide. Such a physical style guide may be beneficial to administrators or developers to reference the style elements approved for use throughout the system.

In some embodiments, style manager 110 may store design data 122 in a visual library. In such an embodiment, style manager 110 may distribute the reference names 124 directly to developer devices 130. The visual library may be made available to developer devices 130 over network 102. If developer code written on developer devices 130 uses a reference name 124, such code may make use of design data 122 stored remotely in the visual library. By using a reference name 124 in this way, all developer devices 130 may make use of design data 122 stored remotely, which may be updated by style manager 110. If style manager 110 updates design data 122 stored in the visual library, instructions making use of reference name 124 may be updated with no further distribution to developer devices 130.

Developer device 130 is a computing device used by an application developer to create or update applications that are executed on a target platform such as target platform 140A or target platform 140B. One developer device 130 is depicted in the illustration, but in some embodiments there may be a plurality of such devices connected to the system 100. Developer device 130 contains development environment 132 and local definition(s) 134. Development environment 132 is used to develop applications for a certain target platform. For example, development environment 132 may be used to develop applications for target platform 140A, while a different development environment in use on a different developer device in the system may be used to develop applications for target platform 140B. Local definition 134 is a formatted version of visual definition 120 that is compatible with development environment 132. If developer devices 130 are used to develop cross-platform applications, a plurality of developer devices 130 may be needed to develop a plurality of different versions of the same cross-platform application.

Not all developer devices 130 are used to develop for the same target platform, so not all developer devices 130 can make use of the same format of data. Each developer device 130 within the system may need a unique local definition 134 for its development environment 132. For example, local definition 134 may be a smartphone data file if developer device 130 is used to develop smartphone applications, but may be a different data file if developer device 130 is used to develop other kinds of applications, for example, desktop computer applications.

When creating an application or a part thereof, the following process may generally be used. The developer may create the application by using a reference to local definition 134 whenever necessary. For example, instead of defining a color of a certain object in the user interface literally, (i.e., by the color's computer-readable hex code), the developer can define the color of the object using a reference name 124 listed in visual definition 120. In particular, the developer would define the color by reference to local definition 134. That reference may define the color by a reference name 124 like "company primary color". Because the color is defined only by reference to the local definition 134, the process for updating the application when a style element is changed is greatly simplified. If a style element is changed, when style manager 110 distributes a new local definition 134, that reference will remain in the developer's code. However, the reference will now be pointing to a changed definition of the style element contained within the updated local definition 134, meaning the application relying on that reference will update automatically upon distribution of the updated local definition 134.

As an example, say a color is defined by a computer-readable hex code of #FF0000, associated in visual definition 120 with a reference name 124 of "company primary color." Although the actual computer-usable definition of the color is #FF0000, developers can make use of the reference name 124 "company primary color" during development. Developers may use this reference name 124 when creating an application. If a developer wants an object in the user interface to appear as "company primary color" he may define the object's color by reference to the name "company primary color" rather than by using the underlying hex code of #FF0000. This process can also make the resulting code easier to manage and read because the name "company primary color" is easier to find and understand as compared to a hex code for that color. Similarly, if a style element is defined by a phrase such as "table background color" a developer could tell at a glance that the surrounding code must be related to a table in the application.

If the definition of "company primary color" is later changed, for example from a shade of red defined as #FF0000 to a shade of green defined as #00FF00, then an entry in visual definition 120 may be changed so that the change may be propagated to local definitions. The style manager 110 may then create new local definition 134 for each development environment 132 and distribute the local definitions 134 to the appropriate developer device(s) 130. Because the developer's code internally defines colors by their reference names rather than, for example, their hex values, the updated local definitions 134 may be automatically used by reference, as long as the updated files contain the same reference names 124 for the style elements. Beneficially, the developer may not have to perform any action for the application to use the new color definition associated with "company primary color," as the updated local definition 134 is already pointing to the new, correct hex value. Moreover, a plurality of applications maintained by the system may be simultaneously updated by the same process, keeping developers and developer devices in sync.

If the developer instead defined the color directly with the computer-readable value, the updating process when the color is changed involves manually altering every value in the code, from the old computer-readable value of #FF0000 to the updated computer-readable value of #00FF00. Because the systems and methods described herein allow for updating automatically based on a reference name, which may require no developer action, the efficiency and consistency of the development process may be improved. For example, such systems and methods may reduce the risk that a developer will erroneously update a value to an incorrect value, or miss a value entirely.

Target platforms 140A-B are computing devices used to provide applications to users. In some embodiments, a greater number of target platforms may be supported. A target platform may refer to a device type, such as a mobile device, or a device model, such as a particular smartphone model, or an operating system running on a variety of device models, such as iOS, or an attribute of a device, such as a wide format touchscreen device, and the like, on which an application is developed for execution. For example, while a specific smartphone may be the device used to run an application, the smartphone's operating system or environment may be a target platform 140. As illustrated, target platforms 140A-B contain application 142. Application 142 may serve essentially the same function, or perform essentially the same process when executing on either target platform 140A or 140B. For example, two applications 142 may be tax preparation applications, designed for different target platforms 140A-B. There may be differences between the two applications 142, such as implementation differences, but the two applications 142 serve the same purpose and may be essentially identical from the user's perspective. In particular, the user interfaces of the two applications 142 may be visually indistinguishable. Application 142 may be a cross-platform application i.e., a single application designed to be executed on a plurality of platforms, for example target platforms 140A and 140B.

Figure 2:
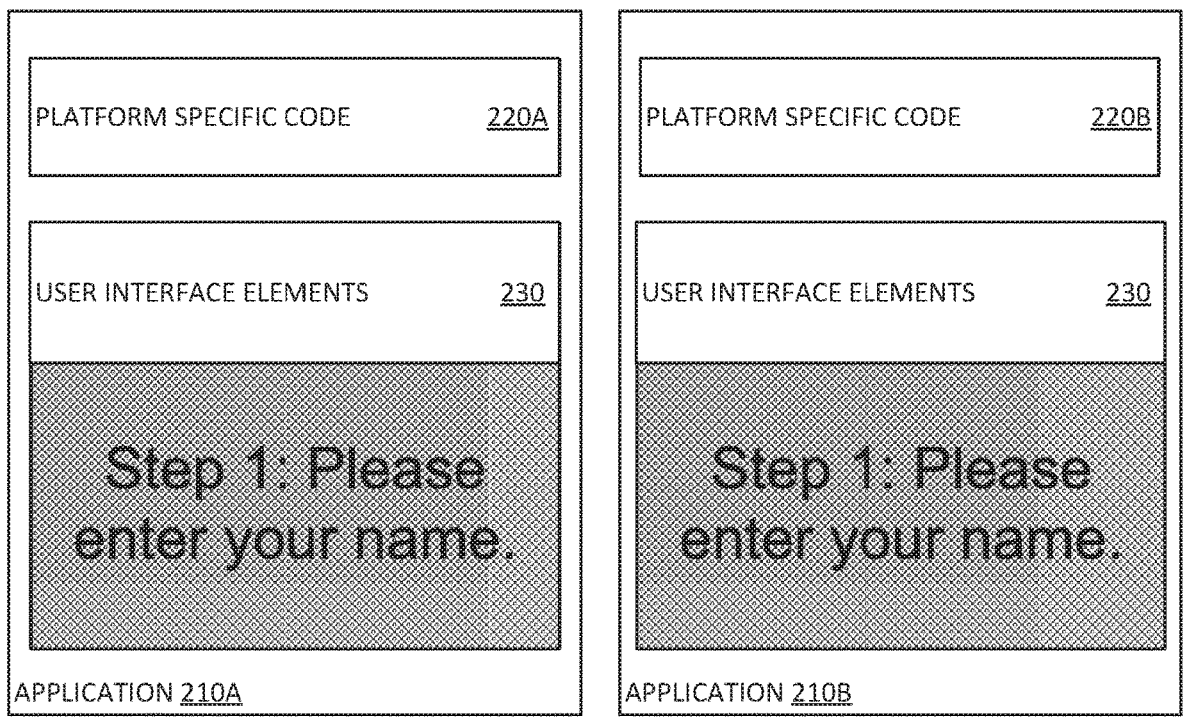
FIG. 2 illustrates two exemplary applications with user interfaces defined by common design data, according to one embodiment.

FIG. 2 illustrates two exemplary applications 210A and 210B, according to an embodiment. An application typically includes platform specific code (e.g., 220A and 220B) and user interface elements 230. Platform specific code 220A and 220B are the computer instructions that allow the applications 210A and 210B to run on a given platform. As shown in FIG. 2, each target platform on which an application (e.g., 210A and 210B) executes may need its own platform specific code for the application to operate. For example, the code that enables a native application to operate may not be fully or partially portable to a different platform. For that reason, each supported target platform in the system may need its own application supported by its own platform specific code. Applications 210A and 210B may be different versions of a cross-platform application.

Each application 210A and 210B also includes user interface elements 230. User interface elements 230 may be developed by an application developer using a developer device, such as developer device 130 in FIG. 1. For example, referring back to FIG. 1, visual definition 120 is used to create local definitions 134, which in turn are used to create user interface elements 230 of FIG. 2. In some examples, user interface elements 230 within applications 210A and 210B consist of the approved style elements of visual definition 120, as shown in FIG. 1.

User interface elements 230 on application 210A and application 210B may be generated by separate processes on separate developer devices (e.g., 130 in FIG. 1) using separate local definitions (e.g., 134 in FIG. 1). Because the local definitions may be generated from a centralized visual definition (e.g., 120 in FIG. 1), the resulting user interface elements 230 make use of the same style elements and have the same appearance. As a result, application 210A and application 210B themselves appear substantially the same to a user. Thus, it is possible to provide users of different platforms with substantially the same experience.

Figure 3:
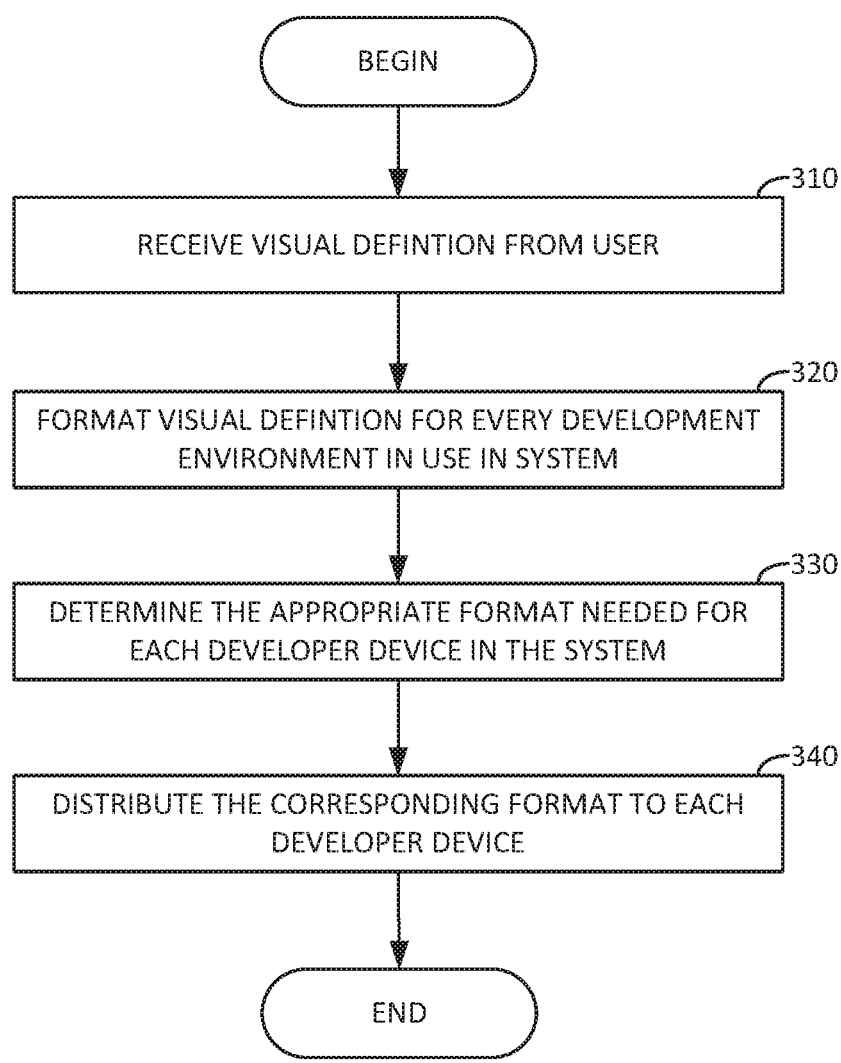
FIG. 3 illustrates example operations for distributing design data within a computing system, according to an embodiment.

FIG. 3 illustrates example operations that may be performed by a style manager, such as style manager 110 of FIG. 1, to distribute design data within a computing system, according to an embodiment. As illustrated, operations 300 begin at step 310, where a style manager receives visual definitions from a user of a system. This visual definition may comprise style elements approved by the user, which may include computer-readable design data as well as human-readable reference names associated with that design data.

Operations 300 then proceed to step 320 where the style manager generates new local definitions, such as local definitions 134 in FIG. 1, which correspond to each development environment in use on developer devices in the system. The style manager may use a formatter, such as formatter 114 of FIG. 1, to perform this step. In some examples, the formatter accesses a developer list, such as developer list 118 of FIG. 1, to determine which data formats are in use in the system. For example, a system that has only a single target platform may only need a single local definition. A system that has many target platforms may need as many data formats as there are target platforms. The formatter converts design data into a format usable by development environments for different platforms in use by the system. That is, each association between an element of design data representing a style element and a reference name is processed into a format that can be directly used by the development environments on developer devices.

Operations 300 then proceed to step 330 where the style manager determines the appropriate local definition needed for each developer device in the system. The style manager utilizes a distributor, such as distributor 116 of FIG. 1, to perform this step. The distributor accesses the developer list to find the correct pairings between developer devices and development environments, and which format is needed for that development environment.

Operations 300 then proceed to step 340 where the style manager distributes the correct local definition to each developer device via network 102. The style manager utilizes a distributor, such as distributor 116 of FIG. 1, to perform this step.

Figure 4:
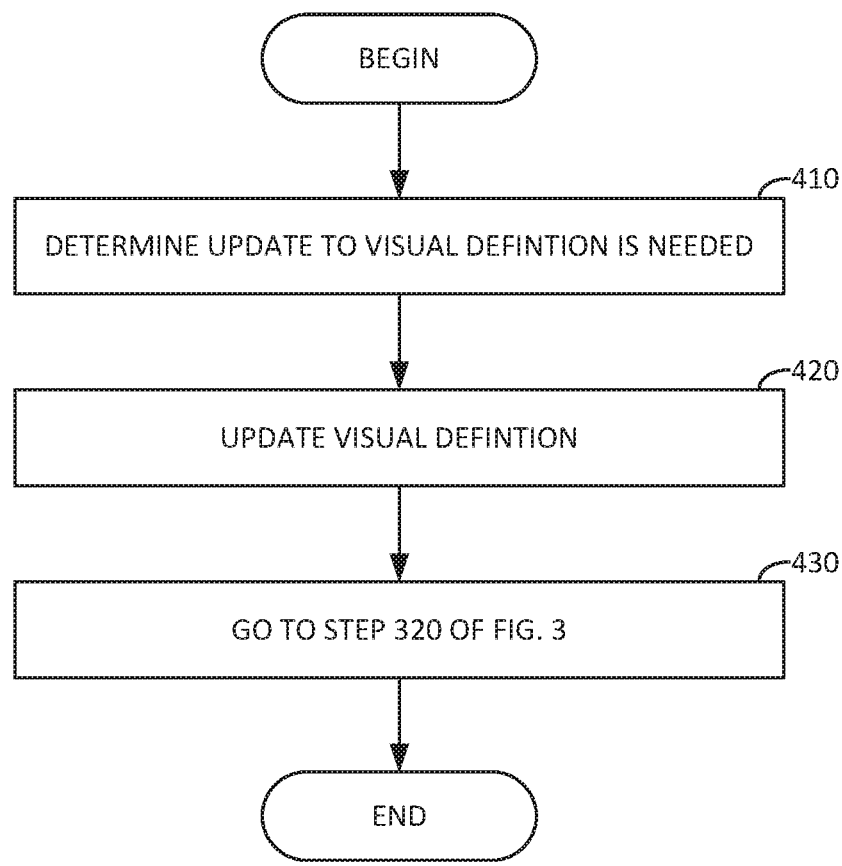
FIG. 4 illustrates example operations for updating style elements within a computing system, according to an embodiment.

FIG. 4 illustrates example operations that may be performed by a style manager, such as style manager 110 of FIG. 1, to update data visual definition within a computing system, according to an embodiment. As illustrated, operations 400 begin at step 410, where a style manager determines an update to the visual definition is needed. This determination may be based on input from a user of the system which modifies, adds or deletes a style element represented by the visual definition.

Operations 400 then proceed to step 420 where the style manager updates the visual definition by modifying the visual definition as needed, which may be modifying, adding or deleting a design data/reference name pair.

Operations 400 then proceed to step 430 where the operations follow the same steps as described starting at step 320 in FIG. 3.

Figure 5:
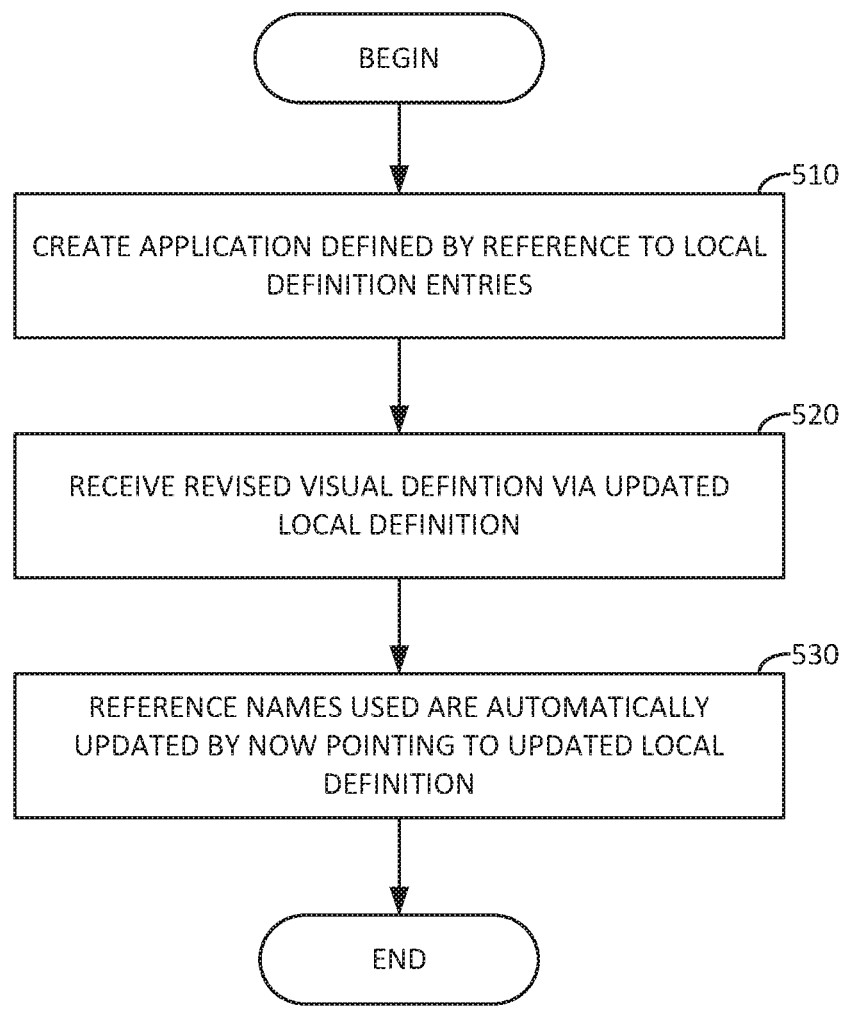
FIG. 5 illustrates example operations for making use of style information provided by a style manager, according to one embodiment.

FIG. 5 illustrates example operations that may be performed on a developer device to make use of style information provided by a style manager. As illustrated, operations 500 begin at step 510, where a local definition stored on a developer device is used in the creation of an application. Specifically, style elements used in the application are defined by reference to the local definition. That is, the human-readable reference names (e.g., "company primary color") for style elements are used in developer code, rather than the computer-readable design data values (e.g., "#FF0000") for those style elements.

Operations 500 then proceed to step 520 where an updated local definition is received by the developer device. Such a local definition may be generated by a style manager and sent to the developer device. In some cases, a new local definition being generated indicates an update has been made to the underlying visual definition, and thus the application needs to be updated to incorporate the updates.

Operations 500 then proceed to step 530, where the references to style elements are automatically updated. When the references to style elements are made in step 510, they are made only to entries on the local definition stored on developer device. The version of the local definition that those references point to is replaced in step 520 when an updated local definition is received. However, because the references are made only to the reference names in the local definition, a change to the computer-readable design data value associated with that name does not break the association. That is, the reference now points to the updated local definition, which contains the revised computer-readable value. The reference points to, and thus the application uses, the new, revised style element definition. The application has therefore been updated to reflect the change in the visual definition with no further action by the developer.

Figure 6:
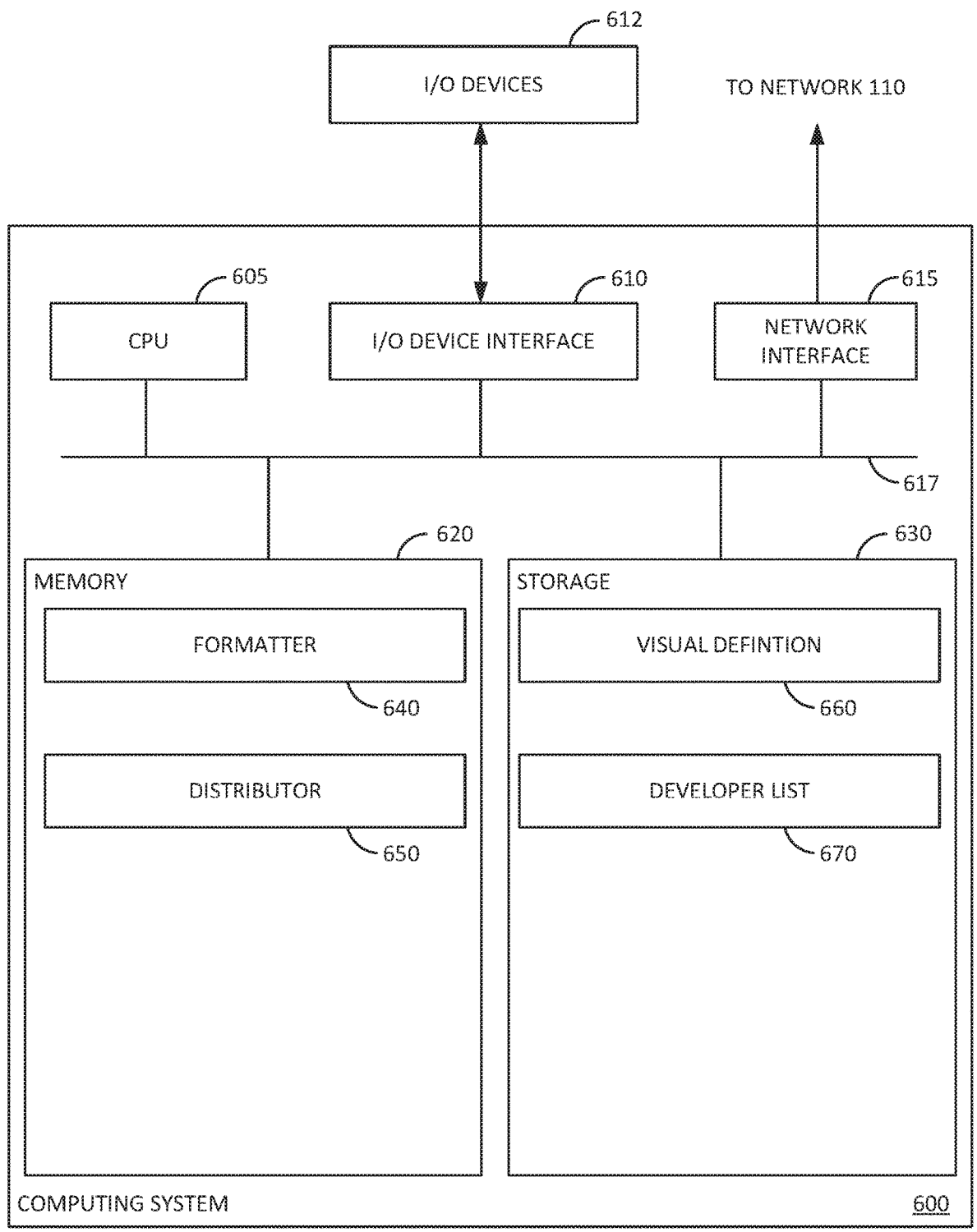
FIG. 6 illustrates an exemplary computing system for managing and distributing style and theme data, according to one embodiment.

FIG. 6 illustrates a computing system 600 configured as a style manager that organizes, formats, and distributes style information for devices in the system, according to an embodiment. As shown, the computing system 600 includes a central processing unit (CPU) 605, a network interface 615, a memory 620, and storage 620, each connected to a bus 617. The computing system 600 may also include an I/O device interface 610 connection I/O devices 612 (e.g., keyboard, display and mouse devices) to the computing system 600.

CPU 605 may retrieve and execute programming instructions stored in the memory 620. Similarly the CPU 605 may retrieve and store application data residing in the memory 620. The bus 617 transmits programming instructions and application data, among the CPU 605, I/O device interface 610, network interface 615, memory 620, and storage 630. CPU 605 is included to be representative of a single CPU, multiple CPUs, a single CPU having multiple processing cores, and the like. Additionally, the memory 620 is included to be representative of a random access memory. Furthermore, the storage 630 may be a disk drive, solid state drive, or a collection of storage devices distributed across multiple storage system. Although shown as a single unit, the storage 630 may be a combination of fixed and/or removable storage devices, such as fixed disc drives, removable memory cards or optical storage, network attached storage (NAS), or a storage area-network (SAN).

As shown, memory 620 includes a formatter 640 and a distributor 650. Formatter 640 generally processes visual definition 660 into a format usable elsewhere in the system. It performs this process using, in part, information stored in the developer list 670. Distributor 650 generally takes the formatted versions of visual definition 660 and sends the data elsewhere in the system, via bus 617 and network interface 615.

As shown, storage 630 includes visual definition 660 and a developer list 670. Visual definition 660 is a pairing of design data values, i.e., computer-readable values for stylistic or appearance elements, and reference names for those values. Visual definition 660 may represent many kinds of style elements, including colors, fonts, themes or any other value which affects the visual appearance of an application.

Developer list 670 is a pairing of other devices in the system and development environments used by those devices. Distributor 650 uses developer list 670 to find the correct pairings and then transmits the formatted versions of visual definition 660 to other devices in the system.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A server comprising:
a memory including computer readable instructions; and
a processor configured to execute the computer readable instructions and cause the server to:
receive a visual definition defining a set of user interface elements of a cross-platform application, wherein the visual definition comprises:
computer readable design data that includes a representation of a style element; and
a reference name that is paired with the design data;
access a developer list that includes a pairing of each developer device and a set of development environments in use on each developer device;
generate, based on the developer list, a local definition for each development environment in use on each developer device, wherein the local definition is compatible with the development environment, and wherein the local definition defines the user interface elements for a version of the cross-platform application;
determine, based on the developer list, the local definition for each development environment in use on each developer device, wherein the development environment is used to develop the version of the cross-platform application for a type of computing device;
transmit the local definition for each development environment to each developer device;
receive an updated local definition comprising a modified style element paired with the reference name;
update the visual definition based on the modified style element;
generate an updated local definition; and
transmit the updated local definition to each developer device.

2. The server of claim 1, the server being further configured to:
format the visual definition into an image definition compatible with an image manipulation program; and
transmit the image definition to an image creation device associated with the image manipulation program.

3. The server of claim 1, the server being further configured to:
allow access to a visual library by the developer device, wherein the visual library comprises stored design data associated with the style element and the paired reference name.

4. The server of claim 1, the server being further configured to generate a printable document comprising a printable version of the visual definition.

5. The server of claim 1, wherein the style element comprises one of:
a color value;
a font; or
table dimensions.

6. The server of claim 1, the server being further configured to:
receive a request, from a developer device, for the style element and the reference name stored in a visual library.

7. A method for deploying centralized design data in a development system comprising:
receiving a visual definition defining a set of user interface elements of a cross-platform application, wherein the visual definition comprises:
computer readable design data that includes a representation of a style element; and
a reference name that is paired with the design data;
accessing a developer list that includes a pairing of each developer device and a set of development environments in use on each developer device;
generating, based on the developer list, a local definition for each development environment in use on each developer device, wherein the local definition is compatible with the development environment, and wherein the local definition defines the user interface elements for a version of the cross-platform application;
determining, based on the developer list, the local definition for each development environment in use on each developer device, wherein the development environment is used to develop the version of the cross-platform application for a type of computing device;
transmitting the local definition for each development environment to each developer device;
receiving an updated local definition comprising a modified style element paired with the reference name;

updating the visual definition based on the modified style element;

generating an updated local definition; and transmitting the updated local definition to each developer device.

8. The method of claim 7, further comprising:

formatting the visual definition into an image definition compatible with an image manipulation program; and transmitting the image definition to an image creation device associated with the image manipulation program.

9. The method of claim 7, further comprising:

allowing access to a visual library by the developer device, wherein the visual library comprises storing design data associated with the style element and the paired reference name.

10. The method of claim 7, further comprising generating a printable document comprising a printable version of the visual definition.

11. The method of claim 7, wherein the style element comprises one of:

a color value;

a font; or table dimensions.

12. The method of claim 7, further comprising:

receiving a request, from a developer device, for the style element and the reference name stored in a visual library.

13. A non-transitory computer readable storage medium comprising instructions to be executed in a computer system, wherein the instructions when executed in the computer system perform a method for deploying centralized design data in a development system comprising:

receiving a visual definition defining a set of user interface elements of a cross-platform application, wherein the visual definition comprises:

computer readable design data that includes a representation of a style element; and a reference name that is paired with the design data;

accessing a developer list that includes a pairing of each developer device and a set of development environments in use on each developer device;

generating, based on the developer list, a local definition for each development environment in use on each developer device, wherein the local definition is compatible with the development environment, and wherein the local definition defines the user interface elements for a version of the cross-platform application;

determining, based on the developer list, the local definition for each development environment in use on each developer device, wherein the development environment is used to develop the version of the cross-platform application for a type of computing device;

transmitting the local definition for each development environment to each developer device;

receiving an updated local definition comprising a modified style element paired with the reference name;

updating the visual definition based on the modified style element;

generating an updated local definition; and transmitting the updated local definition to each developer device.

14. The non-transitory computer readable storage medium of claim 13, further comprising:

formatting the visual definition into an image definition compatible with an image manipulation program; and transmitting the image definition to an image creation device associated with the image manipulation program.

15. The non-transitory computer readable storage medium of claim 13, further comprising:

allowing access to a visual library by the developer device, wherein the visual library comprises storing design data associated with the style element and the paired reference name.

16. The non-transitory computer readable storage medium of claim 13, further comprising generating a printable document comprising a printable version of the visual definition.

17. The non-transitory computer readable storage medium of claim 13, wherein the style element comprises one of;

a color value;

a font; or table dimensions.

* * * * *

UNITED STATES PATENT AND TRADEMARK OFFICE
CERTIFICATE OF CORRECTION

PATENT NO. : 10,534,587 B1  
APPLICATION NO. : 15/849844  
DATED : January 14, 2020  
INVENTOR(S) : Eric Knudtson and Richard Lee Romero Page 1 of 1

It is certified that error appears in the above-identified patent and that said Letters Patent is hereby corrected as shown below:

On the Title Page

In the inventors names:
Item (72), Inventors: please replace "Eric Knudtson, Mountain View, CA (US); Richard Lee Romero, Mountain View, CA (US)" with --Eric Knudtson, Mountain View, CA (US); Richard Lee Romero, Mountain View, CA (US); Clark Harris Weeks, II, Portland, OR (US)--.

Signed and Sealed this  
Sixth Day of October, 2020

Andrei Iancu  
*Director of the United States Patent and Trademark Office*